J. O. ELLINGER.
UNIT FRAME.
APPLICATION FILED MAR. 21, 1910.
1,293,061.
Patented Feb. 4, 1919.
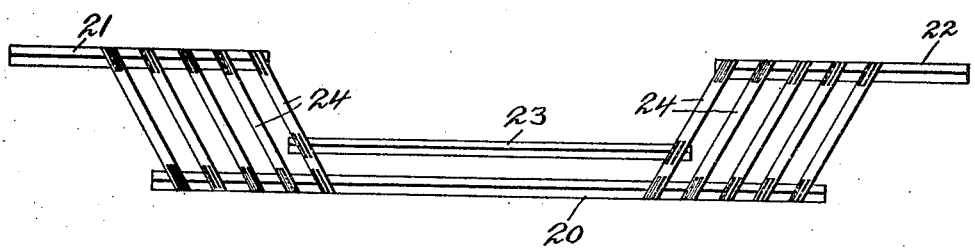
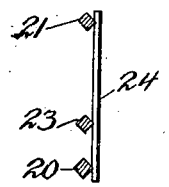
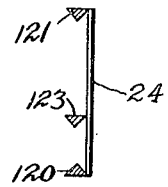
Inventor:
J. O. Ellinger
by Cornelius C. Billings
his Attorney

UNITED STATES PATENT OFFICE.

JULIAN O. ELLINGER, OF NEW YORK, N. Y.

UNIT-FRAME.

1,293,061.   Specification of Letters Patent.   Patented Feb. 4, 1919.

Application filed March 21, 1910. Serial No. 550,575.

*To all whom it may concern:*

Be it known that I, JULIAN O. ELLINGER, a citizen of the United States, and a resident of the city, county, and State of New York, have invented certain new and useful Improvements in Unit-Frames, of which the following is a specification.

This invention relates to unit frames for reinforcing concrete and like plastic material which is or may be used in building and engineering structures, for example, and it embodies certain novel formations and arrangements of its tension and shear members which are homogeneously united at their places of intersection as by electrically welding them together.

In the accompanying drawings, wherein like characters of reference designate corresponding parts in the several views, I have illustrated typical examples of unit frames embodying my present improvements, and in these drawings:

Figure 1 is a side elevation of a unit frame whose tension members are formed of polygonal bars of one character.

Fig. 2 is an end view of the same.

Fig. 3 is an end view illustrating bars of slightly changed polygonal form.

Fig. 4 illustrates a form embodying polygonal bars and tension members of loop formation.

In a general way it may be stated that the frame of the present invention is composed of longitudinal bars or tension members and transverse or shear elements homogeneously united with each other as by being electrically welded at their places of intersection. In order to render this practicable, I have found that restricted areas for welding purposes must be produced at the places of intersection, it being impracticable electrically to weld intersecting flat surfaces together unless one or both of such surfaces have what may be arbitrarily designated as welding points or projections. When these are in the form of protuberances or ribs, they add materially to the expense of the production of the frame, and one of the purposes of my present invention is to eliminate this expense. The forms shown in Figs. 1 to 4 inclusive, exemplify practical ways of accomplishing this purpose.

Referring first to the form shown in Figs. 1 and 2, the part marked 20 designates a longitudinal bar, the parts marked 21 and 22 are other longitudinal bars and the part marked 23 is still another longitudinal bar, all suitably spaced apart and forming tension elements of the frame. Of these bars the ones marked 21 and 22 are arranged at the ends of the frame, over the bars 20, and project outwardly beyond the ends of the latter. Their inner ends are separated from each other by a space, and the bar 23 wholly or partially crosses this space and is arranged between the horizontal planes of the other bars referred to. The shear members 24 preferably are inclined and are homogeneously united to the before-mentioned bars where they intersect the same. Provision for this is made by a polygonal formation of each tension member and by presenting it cornerwise to the element to which it is to be united. This forms a point which can be homogeneously united, as by electric welds, for example, to the shear elements without necessitating the rolling of the tension element with protuberances, ribs or like projections from its body. It will be observed upon reference to Fig. 2, that I have shown bars which are approximately square in cross section but turned to present their corners, instead of their flat sides to the shear members, which latter are illustrated as being flat.

Instead of being approximately square, the bars may be of other polygonal shape, as triangular for example; see Fig. 3 in which the bars marked 120, 121 and 123 are triangular in shape.

In all the figures referred to the shear members, uniformly marked 24 therein, are plain, flat strips, having welding projections but they may be round and free from welding projections, or of any other suitable shape if preferred. These strips are shown on one side only of the frame, but obviously they may be arranged also on the other side thereof, if desired, and be either oppositely disposed or in an alternating arrangement as preferred. Again, they may be of loop formation, as shown at 24 in Fig. 4.

Having now described my invention, what I claim as new and desire to secure by Letters Patent is:

1. A unit frame for reinforcing concrete, comprising a shear member and a polygonal tension member arranged cornerwise relatively to the shear member and homogeneously united to the latter at its corner said polygonal member being free from welding projections at the places for its union with the shear member.

2. A unit frame for reinforcing concrete, comprising a plurality of transverse straps and a plurality of polygonal longitudinal bars arranged cornerwise to the straps and weldably united to the latter at their corners.

In witness whereof I have hereunto set my hand at the city, county and State of New York, this 18th day of March, 1910.

JULIAN O. ELLINGER.

In presence of—
H. L. STEWART,
V. C. DAVIDSON.

Copies of this patent may be obtained for five cents each, by addressing the "Commissioner of Patents, Washington, D. C."